United States Patent
Lee et al.

(10) Patent No.: US 12,033,587 B2
(45) Date of Patent: Jul. 9, 2024

(54) DISPLAY DRIVING APPARATUS AND METHOD

(71) Applicant: LX SEMICON CO., LTD., Daejeon (KR)

(72) Inventors: Do Hoon Lee, Daejeon (KR); Hyun Kyu Jeon, Daejeon (KR); Ji Won Lee, Daejeon (KR); Jung Eun Baek, Daejeon (KR); Jae Chan Cho, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 18/063,200

(22) Filed: Dec. 8, 2022

(65) Prior Publication Data

US 2023/0206860 A1    Jun. 29, 2023

(30) Foreign Application Priority Data

Dec. 29, 2021    (KR) .................. 10-2021-0191102

(51) Int. Cl.
*G09G 3/3275* (2016.01)
*B60K 35/00* (2024.01)
(Continued)

(52) U.S. Cl.
CPC .......... *G09G 3/3275* (2013.01); *B60K 35/00* (2013.01); *G09G 3/3233* (2013.01); *G09G 3/3266* (2013.01); *B60K 35/22* (2024.01); *B60K 35/28* (2024.01); *B60K 2360/16* (2024.01); *G09G 2300/0842* (2013.01); *G09G 2310/0213* (2013.01); *G09G 2310/08* (2013.01);
(Continued)

(58) Field of Classification Search
CPC .. G09G 3/3233; G09G 3/3266; G09G 3/3275; G09G 2320/0285; G09G 2310/08; G09G 2320/0686; G09G 2310/0213; G09G 2320/0233; G09G 2300/0842; G09G 2310/04; G09G 2360/16; G09G 2320/0613; G09G 2380/10; G09G 2320/045; B60K 35/00; B60K 2370/16; B60K 2370/152
See application file for complete search history.

(56) References Cited

U.S. PATENT DOCUMENTS

| | | | |
|---|---|---|---|
| 11,749,215 B2* | 9/2023 | Lee ...................... | G09G 3/3406 345/87 |
| 2023/0302903 A1* | 9/2023 | Watanabe ............. | G06F 3/1423 701/36 |

FOREIGN PATENT DOCUMENTS

| KR | 20160147173 A | * 12/2016 |
|---|---|---|
| KR | 10-2017-0081043 A | 7/2017 |

* cited by examiner

*Primary Examiner* — Doon Y Chow
(74) *Attorney, Agent, or Firm* — Greenberg Traurig, LLP

(57) ABSTRACT

A display driving apparatus includes a source driving circuit supplying a first source signal to a first display area to display a first image and supply a second source signal to a second display area to sense characteristics of a pixels of the second display area when a display panel operates in a hybrid mode, the second display area being in a turn-off state during the hybrid mode, a gate driving circuit supplying a gate pulse to first gate lines of the first display area and supply the gate pulse to target gate lines of the second display area, a timing controller transferring first image data for the first image and sensing data for sensing to the source driving circuit and compensate for second image data for a second image which is to be displayed after the first image, based on a target compensation value obtained from a sensing result.

19 Claims, 7 Drawing Sheets

(51) Int. Cl.
*B60K 35/22* (2024.01)
*B60K 35/28* (2024.01)
*G09G 3/3233* (2016.01)
*G09G 3/3266* (2016.01)

(52) U.S. Cl.
CPC ............... *G09G 2320/0233* (2013.01); *G09G 2320/0295* (2013.01); *G09G 2320/045* (2013.01); *G09G 2320/0613* (2013.01); *G09G 2360/16* (2013.01); *G09G 2380/10* (2013.01)

(a)

(b)

(c)

(d)

DISPLAY DRIVING APPARATUS AND METHOD

CROSS-REFERENCE TO RELATED APPLICATIONS

This application claims the benefit of the Korean Patent Application No. 10-2021-0191102 filed on Dec. 29, 2021, which is hereby incorporated by reference as if fully set forth herein.

FIELD

The present disclosure relates to a display apparatus, and more particularly, to a source drive integrated circuit (IC) for sensing a characteristic of a driving transistor.

BACKGROUND

Organic light emitting display apparatuses of an active matrix type include an organic light emitting diode (OLED) which self-emits light and have advantages where a response time is fast, emission efficiency and luminance are high, and a viewing angle is wide.

OLEDs which are self-emitting devices include an anode electrode, a cathode electrode, and an organic compound layer (for example, HIL, HTL, EML, ETL, and EIL) formed therebetween. The organic compound layer includes a hole injection layer (HIL), a hole transport layer (HTL), an emission layer (EML), an electron transport layer (ETL), and an electron injection layer (EIL). When a driving voltage is applied to the anode electrode and the cathode electrode, a hole passing through the hole transport layer (HTL) and an electron passing through the electron transport layer (ETL) move to the emission layer (EML) to generate an exciton, and thus, visible light is emitted from the emission layer (EML).

In the organic light emitting display apparatuses, pixels including an OLED are arranged as a matrix type, and luminance of the pixels is adjusted based on a gray level of video data. Each of the pixels includes a driving transistor (for example, a driving thin film transistor (TFT)) which controls a driving current flowing in the OLED, based on a voltage Vgs between a gate electrode and a source electrode thereof. An electrical characteristic, such as a threshold voltage and mobility, of the driving transistor may be degraded as a driving time elapses, and due to this, a deviation may occur in each pixel. When the electrical characteristic of the driving transistor is changed for each pixel, luminance between pixels corresponding to the same video data is changed, and due to this, it is difficult to implement a desired image.

Therefore, technology for sensing a characteristic value of the driving transistor and compensating for a deviation between characteristic values of driving transistors has been developed. However, it is difficult to intactly apply conventional compensation technology to various types of organic light emitting display apparatuses such as foldable display apparatuses, rollable display apparatuses, stretchable display apparatuses, or digital cockpit, or even when the conventional compensation technology is applicable, there is a problem where efficiency is reduced.

SUMMARY

Accordingly, the present disclosure is directed to providing a display driving apparatus and a display driving method that substantially obviate one or more problems due to limitations and disadvantages of the related art.

An aspect of the present disclosure is directed to providing a display driving apparatus and a display driving method, which may sense a characteristic of a driving transistor when a display panel is driven as a turn-on region where an image is displayed and a turn-off region where an image is not displayed.

Another aspect of the present disclosure is directed to providing a display driving apparatus and a display driving method, which may obtain a compensation value corresponding to a full region of a display panel based on a sensing result of a turn-off region.

Another aspect of the present disclosure is directed to providing a display driving apparatus and a display driving method, which may determine an optimal compensation value based on a content type of an image displayed through a full region of a display panel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display driving apparatus including: a source driving circuit configured to supply a first source signal to first pixels included in a first display area of a display panel to display a first image and supply a second source signal to second pixels included in a second display area of the display panel to sense electrical characteristics of the second pixels when the display panel operates in a hybrid mode, the second display area being maintained in a turn-off state during the hybrid mode; a gate driving circuit configured to sequentially supply a gate pulse to first gate lines included in the first display area to drive the first gate lines and supply the gate pulse to at least some target gate lines among second gate lines included in the second display area to drive the target gate lines; and a timing controller configured to transfer first image data for the first image and sensing data for sensing to the source driving circuit and compensate for second image data for a second image which is to be displayed after displaying of the first image, based on a target compensation value obtained from a sensing result obtained through sensing by the source driving circuit, wherein the first display area comprises a plurality of continuous first gate lines, and the second display area comprises a plurality of continuous second gate lines.

In another aspect of the present disclosure, there is provided a display driving method including: setting an operation mode of a display driving apparatus; when the operation mode of the display driving apparatus is a hybrid mode, sequentially supplying a gate pulse to first gate lines included in a first display area of a display panel and supplying a first source signal for displaying to first pixels connected to the first gate lines to display a first image on the first display area; supplying a gate pulse to at least some target gate lines among second gate lines included in a second display area of the display panel and supplying a second source signal for sensing to second pixels connected to the target gate lines to sense electrical characteristics of the second pixels; obtaining a target compensation value based on a sensing result; and compensating for second image data of a second image which is to be displayed after displaying the first image, based on the target compensation value, wherein the first display area comprises a plurality of continuous first gate lines, and the second display area comprises a plurality of continuous second gate lines.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
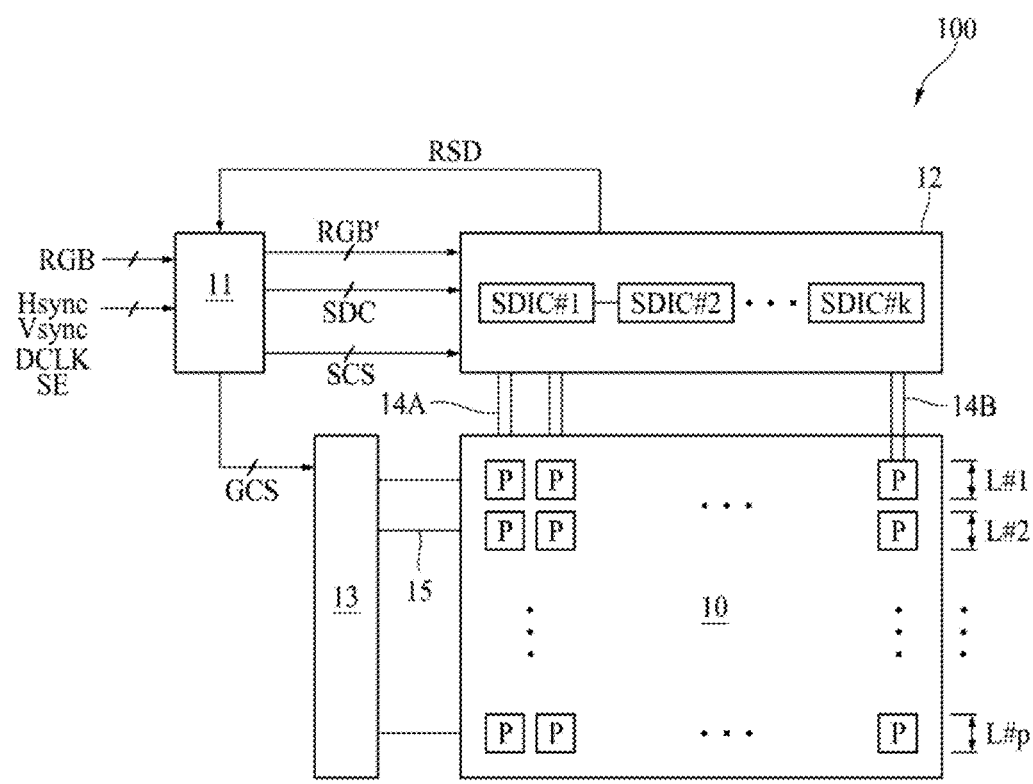
FIG. 1 is a diagram illustrating a display apparatus according to an embodiment of the present invention.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

FIG. 1 is a diagram illustrating a display apparatus 100 according to an embodiment of the present invention. Referring to FIG. 1, the display apparatus 100 according to an embodiment of the present invention may include a display panel 10, a timing controller 11, a source driving circuit 12, and a gate driving circuit 13. The timing controller 11, the source driving circuit 12, and the gate driving circuit 13 may configure a display driving apparatus.

The display panel 10 may display image data RGB' input from the timing controller 11. In an embodiment, the display panel 10 may be a display panel for foldable display apparatuses, rollable display apparatuses, stretchable display apparatuses, or digital cockpit.

According to such an embodiment, the display panel 10 may operate in one of a display mode, a sensing mode, and a hybrid mode, based on an operation mode of the display driving apparatus. The display mode may denote a mode where an image is displayed on a full region of the display panel 10. The sensing mode may denote a mode where sensing is performed through the full region of the display panel 10. The hybrid mode may denote a mode where an image is display on a first display area which is a portion of the display panel 10 and sensing is performed through a second display area which is the other region except the first display area. When the display panel 10 operates in the sensing mode, the display panel 10 may be maintained in a turn-off state where an image is not displayed. Also, when the display panel 10 operates in the hybrid mode, the second display area of the display panel 10 may be maintained in the turn-off state.

In an embodiment, in a case where the display panel 10 is implemented as a digital cockpit, the display panel 10 may operate in the display mode when a vehicle including the display panel 10 is not driving, and thus, an image may be displayed on a full region of the display panel 10.

Moreover, the display panel 10 may operate in the sensing mode during a power-off period of the display driving apparatus, and thus, sensing may be performed through the display panel 10.

In the embodiment described above, it has been described that the sensing mode is performed during the power-off period of the display driving apparatus, but the present invention is not limited thereto and the sensing mode may be performed during a blank period where an image is not displayed in performing an operation of the display mode. In this case, sensing may be performed in a partial region, instead of a full region, of the display panel 10.

Moreover, the display panel 10 may operate in the hybrid mode when the vehicle is driving, and thus, an image for an instrument panel may be displayed on the first display area and the second display area may be maintained in a turn-off state where an image is not displayed.

Figure 2:
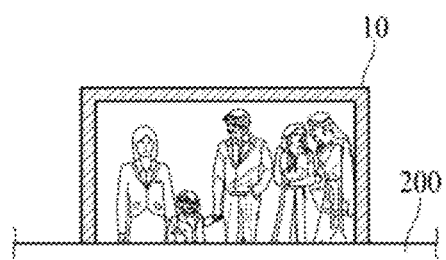
FIG. 2 is a diagram illustrating an example of the state of a display panel based on an operation mode of a display apparatus.
Figure 2:
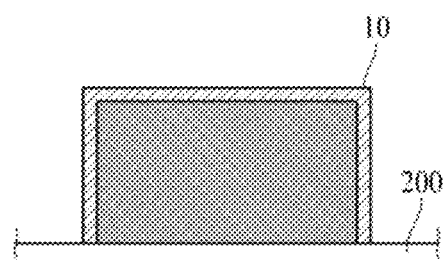
Figure 2:
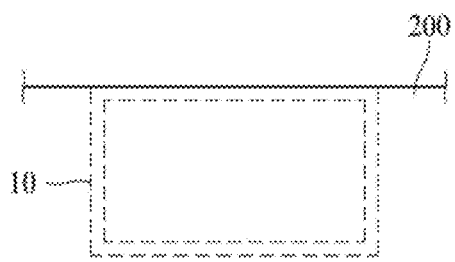
Figure 2:
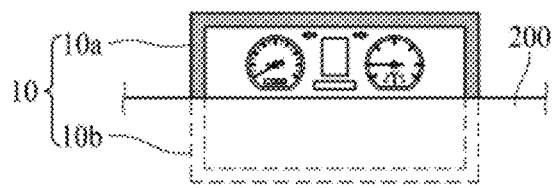

For example, when the vehicle is not driving, as illustrated in FIG. 2A, a full region of the display panel 10 may be raised from the inside of a dashboard 200 to the outside and may be exposed at the outside. Thus, the display panel 10 may operate in the display mode where an image is displayed on the full region.

On the other hand, when the display panel 10 is turned off due to the power-off of the display apparatus as illustrated in FIG. 2B or the full region of the display panel 10 is maintained in the dashboard 200 as illustrated in FIG. 2C, the display panel 10 may operate in the sensing mode.

Moreover, as illustrated in FIG. 2D, when the vehicle is driving, a first display area 10a of the display panel 10 may be raised from the inside of the dashboard 200 to the outside and may be exposed at the outside. Thus, an image for an instrument panel may be displayed on the first display area 10a and a second display area 10b of the display panel 10 may be maintained in a turn-off state where an image is not displayed in the dashboard 200.

As illustrated in FIG. 1, a plurality of data lines 14A, a plurality of sensing lines 14B, and a plurality of gate lines 15 may be formed in the display panel 10 described above. The plurality of data lines 14A and the plurality of sensing lines 14B may be formed to intersect with the plurality of gate lines 15.

A plurality of pixels P may be arranged as a matrix type in a plurality of areas defined by intersections of the plurality of data lines 14A and the plurality of gate lines 15. In an embodiment, each of the pixels P may include an organic light emitting diode (OLED) (not shown) and one or more thin film transistors (TFTs) (not shown).

The pixel P may be connected to one of the data lines 14A, one of the sensing lines 14B, and one of the gate lines 15. In response to a gate pulse input through the gate line 15, the pixel P may receive a source signal through the data line 14A and may output characteristic information about a driving transistor (not shown) included in each pixel P through the sensing line 14B. In an embodiment, the characteristic information about the driving transistor may include a threshold voltage or mobility of the driving transistor.

The pixel P may be supplied with a high level driving voltage EVDD and a low level driving voltage EVSS from a power generator (not shown).

Figure 3:
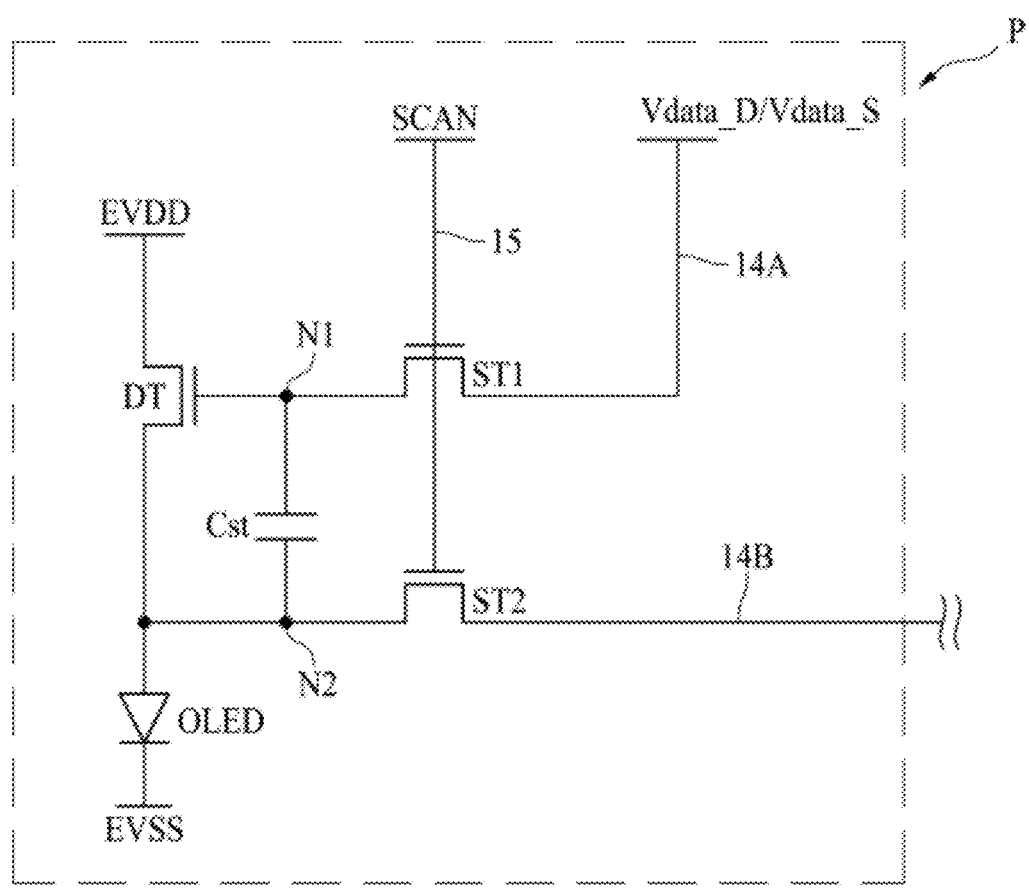
FIG. 3 is a diagram illustrating a pixel configuration according to an embodiment of the present invention.

An example of a configuration of the pixel P is illustrated in FIG. 3. Referring to FIG. 3, the pixel P according to the present invention may include a first switching transistor ST1, a second switching transistor ST2, a storage capacitor Cst, a driving transistor DT, and an OLED.

The first switching transistor ST1 may apply a source signal (Vdata-D or Vdata-S) transferred through the data line 14A to a first node N1 in response to a gate pulse SCAN. The first switching transistor ST1 may include a gate electrode connected to the gate line 15, a drain electrode connected to the data line 14A, and a source electrode connected to the first node N1.

The second switching transistor ST2 may switch a current flow between a second node N2 and the sensing line 14B in response to the gate pulse SCAN. The second switching transistor ST2 may include a gate electrode connected to the gate line 15, a drain electrode connected to the sensing line 14B, and a source electrode connected to the second node N2.

The storage capacitor Cst may be connected between the first node N1 and the second node N2.

The driving transistor DT may control the amount of current input to the OLED based on a gate-source voltage Vgs thereof. The driving transistor DT may include a gate electrode connected to the first node N1, a drain electrode connected to an input terminal for the high level driving voltage EVDD, and a source electrode connected to the second node N2.

The OLED may include an anode electrode connected to the second node N2, a cathode electrode connected to an input terminal for the low level driving voltage EVSS, and an organic compound layer disposed between the anode electrode and the cathode electrode.

A pixel structure illustrated in FIG. 3 is merely an embodiment for helping understand and may be variously modified, and thus, the inventive concept is not limited to the embodiment.

Referring again to FIG. 1, the timing controller 11 may control an operation of each of the source driving circuit 12 and the gate driving circuit 13. In detail, the timing controller 11 may generate a source control signal SCS for controlling an operation timing of the source driving circuit 12 and a gate control signal GCS for controlling an operation timing of the gate driving circuit 13, based on timing signals TS such as a vertical synchronization signal Vsync, a horizontal synchronization signal Hsync, a dot clock signal DCLK, and a source output enable signal SOE.

In an embodiment, the timing controller 11 may set an operation mode of the display apparatus 100 and may control an operation of each of the source driving circuit 12 and the gate driving circuit 13 based on the set operation mode. Particularly, the timing controller 11 according to the present invention may determine an operation mode of the display apparatus 100 as one of the display mode, the sensing mode, and the hybrid mode and may control an operation of each of the source driving circuit 12 and the gate driving circuit 13 so that the display apparatus 100 is driven, based on the determined operation mode.

Hereinafter, a configuration of the timing controller 11 according to the present invention will be described in more detail with reference to FIG. 4.

Figure 4:
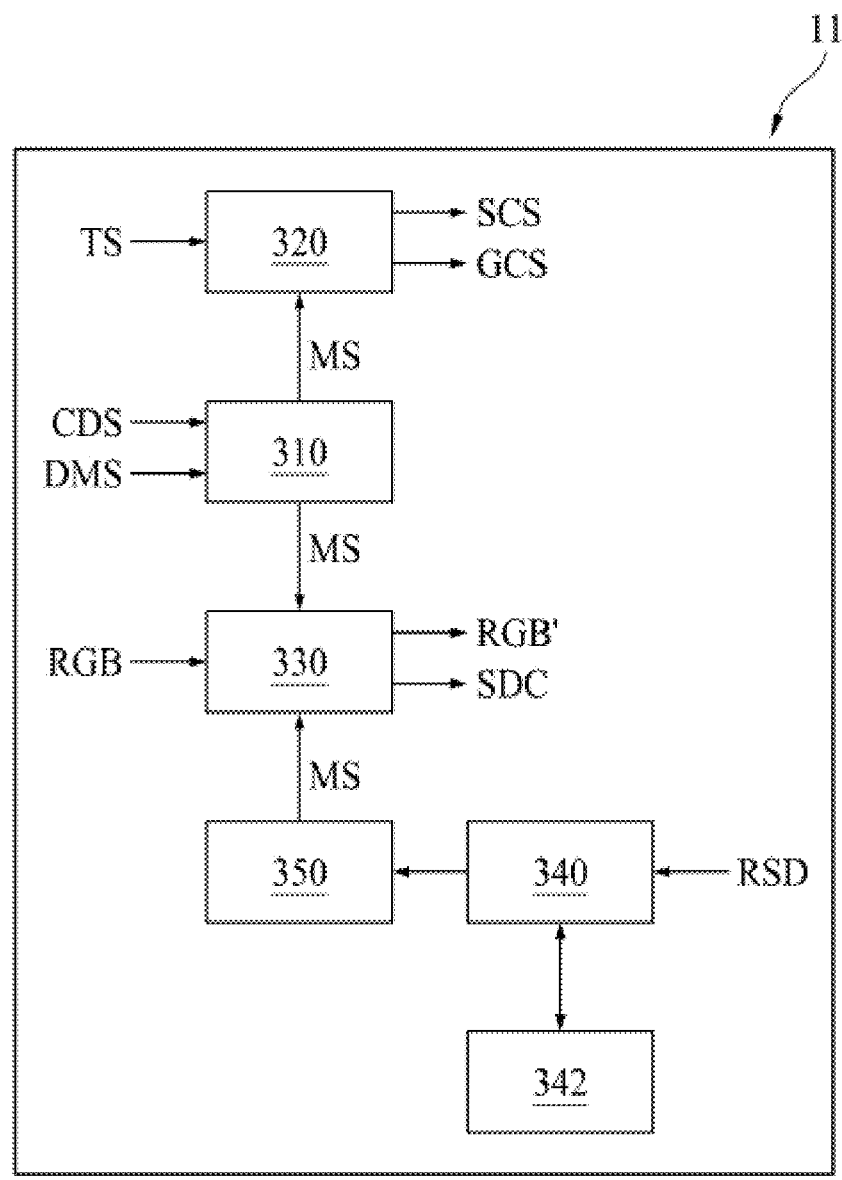
FIG. 4 is a block diagram illustrating a configuration of a timing controller according to an embodiment of the present invention.

FIG. 4 is a block diagram illustrating a configuration of a timing controller according to an embodiment of the present invention. As illustrated in FIG. 4, the timing controller 11 may include an operation mode setting unit 310, a control signal generator 320, a data processor 330, a content type determiner 340, and a data compensator 350.

The operation mode setting unit 310 may set an operation mode of the display apparatus 100. In detail, the operation mode setting unit 310 may determine an operation mode of the display apparatus 100 as one of the display mode, the sensing mode, and the hybrid mode. The display mode is a mode where an image is displayed on a full region of the display panel 10. The sensing mode is a mode where a sensing value is obtained by sensing characteristic information about a driving transistor. The hybrid mode is a mode where an image is display on the first display area 10a of the display panel 10 and the sensing value is obtained by sensing the characteristic information about the driving transistor through the second display area 10b. In this case, the sensing mode may be performed in performing a power-on operation or a power-off operation, or may be performed in blank periods while the display mode is being driven.

The operation mode setting unit 310 may determine an operation mode of the display apparatus 100 based on a vehicle driving-related signal CDS, a display panel elevation signal DMS, etc. In this case, the vehicle driving-related signal CDS and the display panel elevation signal DMS may be generated by an electronic control unit (ECU) of the vehicle and may be input to the operation mode setting unit 310.

For example, when a display panel raising signal and a vehicle driving start signal are received from the ECU of the vehicle, the operation mode setting unit 310 may set an operation mode of the display apparatus 100 to the hybrid mode.

When a display panel lowering signal or a power-off signal of the display apparatus off signal received from the ECU of the vehicle, the operation mode setting unit 310 may set an operation mode of the display apparatus to the sensing mode.

When the display panel raising signal and a vehicle driving stop signal received from the ECU of the vehicle, the operation mode setting unit 310 may set an operation mode of the display apparatus 100 to the display mode.

In an embodiment, when an operation mode of the display apparatus 100 is determined as the hybrid mode, the operation mode setting unit 310 may generate information about target gate lines where sensing is to be performed for each frame during the hybrid mode and may provide the generated information to the control signal generator 320. In this case, the positions and number of target gate lines where sensing is to be performed may be set to vary by units of one frame or by units of two or more frames, or may be set so that a variation order of the target gate lines is repeated by units of a predetermined number of frames.

The control signal generator 320 may generate a source control signal SCS for controlling an operation timing of the source driving circuit 12 and a gate control signal GCS for controlling an operation timing of the gate driving circuit 13 so that the source driving circuit 12 and the gate driving circuit 13 operate in a set operation mode, based on timing signals TS supplied from the outside and an operation mode setting signal MS supplied from the operation mode setting unit 310. The control signal generator 320 may transfer the generated source control signal SCS to the source driving circuit 12 and may transfer the gate control signal GCS to the gate driving circuit 13.

Particularly, the control signal generator 320 may generate the gate control signal GCS based on information about a target gate line set by the operation mode setting unit 310 when the display apparatus 100 operates in the hybrid mode.

When the operation mode setting signal MS supplied from the operation mode setting unit 310 indicates the display mode, the data processor 330 may convert video data RGB, input from the outside, into image data RGB' capable of being processed by the source driving circuit 12 and may provide the image data RGB' to the source driving circuit 12.

When the operation mode setting signal MS supplied from the operation mode setting unit 310 indicates the sensing mode, the data processor 330 may generate sensing data SDC for sensing characteristic information about a driving transistor of a pixel P which is to be sensed and may provide the sensing data SDC to the source driving circuit 12.

When the operation mode setting signal MS supplied from the operation mode setting unit 310 indicates the hybrid mode, the data processor 330 may generate image data RGB' which are to be supplied to pixels P included in the first display area 10a and sensing data SDC which is to be supplied to pixels P included in the second display area 10b and may provide the image data RGB' and the sensing data SDC to the source driving circuit 12.

The content type determiner 340 may determine a content type of an image displayed on a full region of the display panel 10 before the display apparatus 100 operates in the hybrid mode based on a sensing result RSD transferred from the source driving circuit 12 when the display apparatus 100 is driven in the hybrid mode.

In an embodiment, the content type may include a normal type which includes general images such as movie or drama, a graphics type which includes images such as a user interface (UI) or a vehicular cluster, a sports type which includes a sports image, and a game type which includes a game image.

In the present invention, the reason that the content type determiner 340 determines a content type of an image displayed on the full region of the display panel 10 is following. When the display apparatus 100 operates in the hybrid mode, sensing values for the full region of the display panel 10 may not be obtained because sensing is performed in only the second display area 10b which is a portion of the display panel 10, Thus, the content type determiner 340 determines the content type of the image displayed on the full region of the display panel 10 and obtains a compensation value corresponding to the full region of the display panel 10 mapped to corresponding content type.

In an embodiment, the content type determiner 340 may determine a content type of an image displayed on the full region of the display panel 10 in the display mode which is performed before the hybrid mode by inputting the sensing result RSD to a first artificial neural network model 342. The sensing result RSD may be transferred from the source driving circuit 12.

In this case, because the first artificial neural network model 342 is previously trained as a training set including a sensing result which is obtained in outputting image data corresponding to each content type for each content type. Thus, when a specific sensing result is input, the first artificial neural network model 342 may return a value of a probability that the input sensing result is a corresponding content type for each content type.

In an embodiment, the first artificial neural network model 342 may be a convolution neural network (CNN)-based algorithm or feature-based algorithm.

In FIG. 4, the content type determiner 340 is illustrated as being included in the timing controller 11, but this is merely an embodiment and a function performed by the content type determiner 340 may be performed by a micro controller unit (MCU) or a micro processor unit (MPU) of the display apparatus 100. According to such an embodiment, the source driving circuit 12 may provide the MCU or the MPU with the sensing result RSD which is obtained in the hybrid mode, and the MCU or the MPU may determine a content type based on the sensing result RSD and may provide the determined content type to the data compensator 350.

The data compensator 350 may obtain a compensation value, mapped to the content type determined by the content type determiner 340, as a target compensation value. In an embodiment, each content type-based compensation value may be stored in a memory (not shown). In another embodiment, each content type-based compensation value may be obtained by a second artificial neural network model (not shown). When sensing results obtained in displaying a image corresponding to each content type on a full screen are input, the second artificial neural network model may be previously trained to output a compensation value corresponding thereto. Therefore, each content type-based compensation value may be obtained by inputting a content type, determined by the content type determiner 340, to the second artificial neural network model. To this end, the data compensator 350 may further include the second artificial neural network model. In another embodiment, when the MCU or the MPU determines a content type based on the sensing result RSD, the MCU or the MPU may obtain a target compensation value based on the determined content type and may provide the target compensation value to the data compensator 350.

When the display mode is again driven after the target compensation value is obtained and the hybrid mode is driven, the data compensator 350 may modulate image data which is to be displayed on the full region of the display panel 10 in driving of the display mode. The data compensator 350 may modulate the image data by adding or multiplying the target compensation value to the image data.

Furthermore, when the sensing result RSD obtained through an operation of the sensing mode is received from the source driving circuit 12, the data compensator 350 may calculate a compensation value for compensating for an electrical characteristic change of a driving transistor included in each pixel P by using a predetermined compensation algorithm. The data compensator 350 may modulate image data which is to be provided to the source driving circuit 12 based on the calculated compensation value. In detail, the data compensator 350 may apply the sensing result RSD, transferred from the source driving circuit 12 in driving of the sensing mode, to a pre-stored compensation algorithm to calculate a threshold voltage deviation and a mobility change amount of the driving transistor included in each pixel P, and then, may calculate a compensation value for compensating for the change amount. The calculated compensation value may be stored in a compensation value storage unit (not shown). Whenever a new compensation value is calculated, a compensation value stored in the compensation value storage unit may be updated to the new compensation value.

In an embodiment, when a first image is displayed on the first display area 10a during the hybrid mode and image data of a second image to be displayed on the full region of the display panel 10 in the display mode performed after the hybrid mode is compensated for, the data compensator 350 may compare luminance of the first image with luminance of a third image displayed in the display mode performed before the hybrid mode to determine a compensation value which is to be used to compensate for the second image.

In detail, when luminance of the first image is lower than luminance of the third image, the data compensator 350 may compensate for the image data of the second image by using a target compensation value obtained based on a sensing result obtained in the hybrid mode.

On the other hand, when luminance of the first image is higher than luminance of the third image, the data compensator 350 may compensate for the image data of the second image by using a compensation value obtained based on a sensing result obtained through the sensing mode performed after an operation of the hybrid mode. This may be because much distortion may occur in image data due to an inaccurate compensation value in a case where the image data of the second image is compensated for based on a compensation value determined based on a content type of the third image, when luminance of the first image is higher than luminance of the third image.

Referring again to FIG. 1, in driving of the display mode, the gate driving circuit 13 may generate a gate pulse for displaying an image based on the gate controls signal GCS, and then, may sequentially supply the generated gate pulse to the gate lines 15. Accordingly, all gate lines 15 may be turned on by a row progressive driving scheme, and thus, an image may be displayed on the full region of the display panel 10.

In driving of the sensing mode, the gate driving circuit 13 may generate a gate pulse for sensing of each pixel P based on the gate control signal GCS, and then, may sequentially supply the generated gate pulse to each of the gate lines 15. Accordingly, electrical characteristics of driving transistors included in pixels connected to each gate line 15 may be sequentially sensed.

In driving of the hybrid mode, the gate driving circuit 13 may generate a gate pulse for displaying of an image on the first display area 10a based on the gate control signal GCS to sequentially supply the generated gate pulse to the first gate lines included in the first display area 10a. In driving of the hybrid mode, the gate driving circuit 13 may generate a gate pulse for sensing of pixels connected to target gate lines among second gate lines included in the second display area 10b to sequentially supply the generated gate pulse to the target gate lines. In this case, the target gate line may be configured with two or more gate lines and may be changed based on a predetermined frame period.

For example, as illustrated in FIGS. 5A to 5D, when the display apparatus 100 is being driven in the hybrid mode, first gate lines 500a to 500n included in the first display area 10a may be sequentially turned on at every frame in $N^{th}$ to $N+3^{th}$ frames, and thus, an image may be displayed through pixels of the first display area 10a.

Figure 5A:
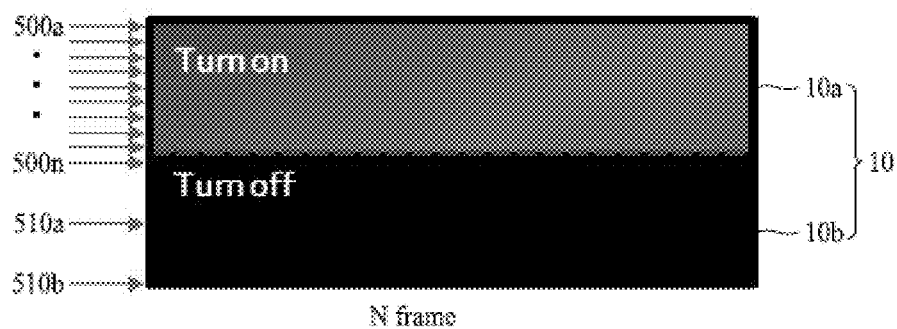
FIGS. 5A, 5B, 5C and 5D are diagrams illustrating a turn-off region and a turn-on region of a display panel and an operation of gate lines in a hybrid mode operation according to an embodiment of the present invention.
Figure 5B:
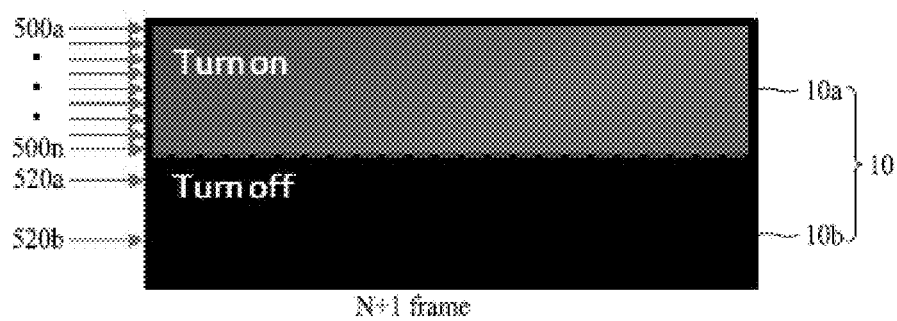

Furthermore, as illustrated in FIG. 5A, in the $N^{th}$ frame, only first target gate lines 510a and 510b may be turned on in the second display area 10b, and thus, electrical characteristics of pixels connected to the first target gate lines 510a and 510b may be sensed. Also, as illustrated in FIG. 5B, in the $N+1^{th}$ frame, only second target gate lines 520a and 520b may be turned on in the second display area 10b, and thus, electrical characteristics of pixels connected to the second target gate lines 520a and 520b may be sensed.

Figure 5C:
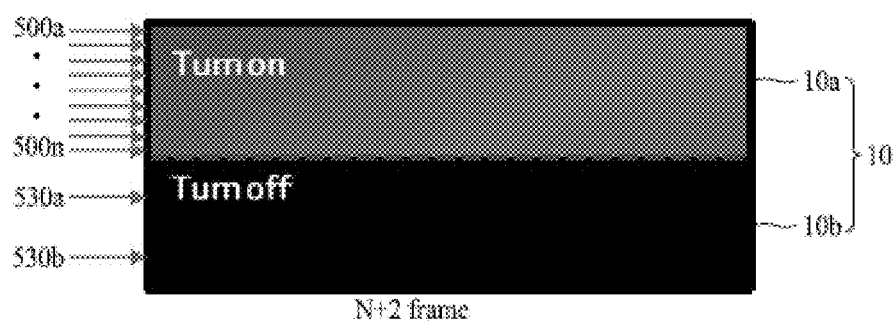
Figure 5D:
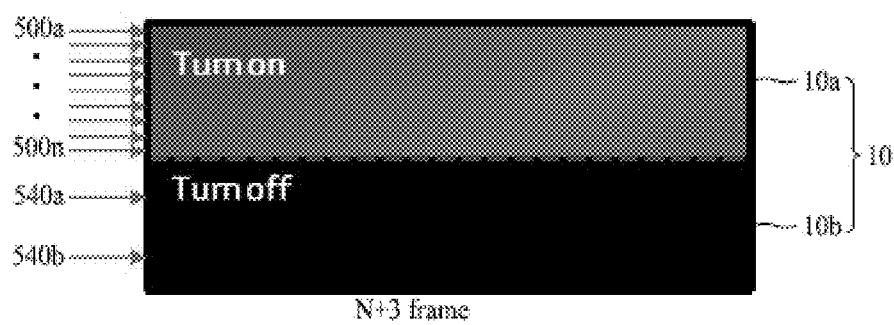

Moreover, as illustrated in FIG. 5C, in the $N+2^{th}$ frame, only third target gate lines 530a and 530b may be turned on in the second display area 10b, and thus, electrical characteristics of pixels connected to the third target gate lines 530a and 530b may be sensed. Also, as illustrated in FIG. 5D, in the $N+3^{th}$ frame, only fourth target gate lines 540a and 540b may be turned on in the second display area 10b, and thus, electrical characteristics of pixels connected to the fourth target gate lines 540a and 540b may be sensed.

In FIGS. 5A to 5D, it has been described that two target gate lines are turned on in the second display area 10b at every frame, but this is merely an embodiment and three or more target gate lines may be selected. Also, in FIGS. 5A to 5D, it has been described that a target gate line is changed by units of one frame, but a target gate line may be changed by units of two or more frames or a change order of target gate lines may be repeated by units of a predetermined number of frames.

In the embodiments described above, a gate pulse applied to gate lines for sensing in the hybrid mode or the sensing mode may be greater in on pulse period than a gate pulse applied to gate lines for displaying of an image in the display mode or the hybrid mode. An on pulse period of a gate pulse used for sensing may correspond to a one line sensing on time. Here, the one line sensing on time may denote a scan time needed for simultaneously sensing pixels P included in one horizontal line L #1 to L #p.

Referring again to FIG. 1, the source driving circuit 12 may be connected to the plurality of data lines 14A and may operate in the display mode, the sensing mode, and the hybrid mode based on mode control by the timing controller 11. As illustrated in FIG. 1, the source driving circuit 12 may include a plurality of source drive ICs SDIC #1 to SDIC #k.

In operating in the display mode, the source drive ICs SDIC #1 to SDIC #k may convert image data RGB' supplied from the timing controller 11 into a display source signal Vdata_D. The source drive ICs SDIC #1 to SDIC #k may supply the display source signal Vdata_D to each pixel P through a corresponding data line 14A.

In operating in the sensing mode, the source drive ICs SDIC #1 to SDIC #k may convert sensing data SDC supplied from the timing controller 11 into a sensing source signal Vdata_S. The source drive ICs SDIC #1 to SDIC #k may supply the sensing source signal Vdata_S to each pixel P through a corresponding data line 14A to sense a characteristic of a driving transistor included in each pixel P. The source drive ICs SDIC #1 to SDIC #k may transfer a sensing result RSD obtained through sensing to the timing controller 11.

In operating in the hybrid mode, the source drive ICs SDIC #1 to SDIC #k may convert image data RGB' supplied from the timing controller 11 into the display source signal Vdata_D. The source drive ICs SDIC #1 to SDIC #k may supply the display source signal Vdata_D to each pixel P included in the first display area 10a through a corresponding data line 14A. Moreover, the source drive ICs SDIC #1 to SDIC #k may convert the sensing data SDC supplied from the timing controller 11 into the sensing source signal Vdata_S. The source drive ICs SDIC #1 to SDIC #k may supply the sensing source signal Vdata_S to each pixel P included in the second display area 10b to corresponding data lines 14A to sense a characteristic of the driving transistor included in each pixel P. The source drive ICs SDIC #1 to SDIC #k may transfer the sensing result RSD obtained through sensing in the second display area to the timing controller 11.

Hereinafter, a configuration of each of the source drive ICs SDIC #1 to SDIC #k according to the present invention will be described in more detail with reference to FIG. 6.

Figure 6:
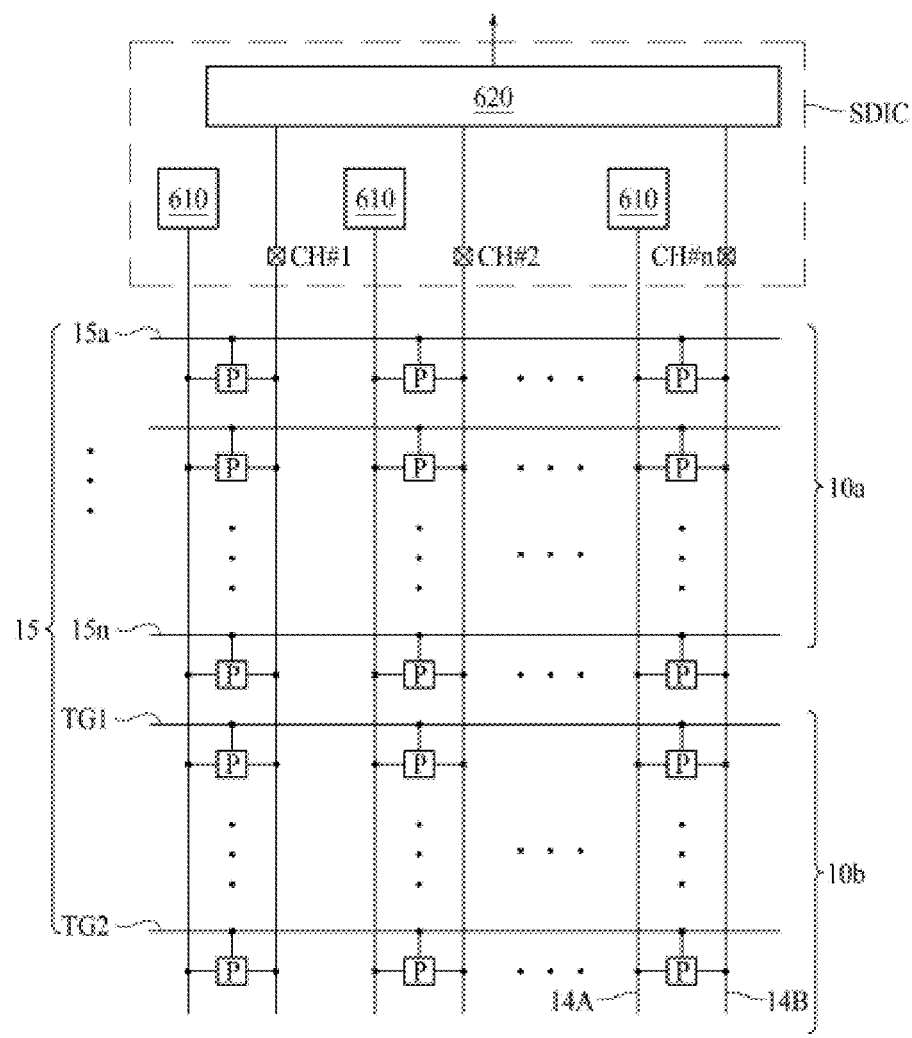
FIG. 6 is a diagram schematically illustrating a configuration of each of a source drive IC and a display panel according to an embodiment of the present invention.

FIG. 6 is a diagram schematically illustrating a configuration of each of a source drive IC and a display panel according to an embodiment of the present invention. Configurations of source drive ICs SDIC #1 to SDIC #k may be the same, and thus, in FIG. 6, only a configuration of one source drive IC SDIC of a plurality of source drive ICs SDIC #1 to SDIC #k will be described for convenience of description.

As illustrated in FIG. 6, a source drive IC SDIC may include a plurality of source signal input units 610 and a sensing block 620.

Each of the plurality of source signal input units 610 may be connected to a data line 14A corresponding thereto and may input a display source signal Vdata_D or a sensing source signal Vdata_S to each pixel P through the corresponding data line 14A. In an embodiment, although not shown, in order to supply the display source signal Vdata_D or the sensing source signal Vdata_S to each pixel P, each of the source signal input units 610 may include elements such as a shift register, a latch, a digital-to-analog converter, and an output buffer.

In driving of the display mode, the source signal input unit 610 may receive image data from the timing controller 11, convert the received image data into the display source signal Vdata_D based on a source control signal SCS, and supply the display source signal Vdata_D to each data line 14A.

Moreover, in driving of the sensing mode, the source signal input unit 610 may receive sensing data from the timing controller 11, convert the received sensing data into the sensing source signal Vdata_S based on the source control signal SCS, and supply the sensing source signal Vdata_S to the data lines 14A.

Moreover, in driving of the hybrid mode, the source signal input unit 610 may convert image data, received from the timing controller 11, into the display source signal Vdata_D based on the source control signal SCS and may supply the display source signal Vdata_D to pixels P connected to first gate lines 15a to 15n of a first display area 10a. Moreover, the source signal input unit 610 may convert sensing data, received from the timing controller 11, into the sensing source signal Vdata_S for sensing based on the source control signal SCS and may supply the sensing source signal Vdata_S to pixels P connected to second gate lines TG1 and TG2 of a second display area 10b.

The sensing block 620 may be connected to sensing lines 14B through sensing channels CH #1 to CH #n and may sense pixels P connected to each sensing line 14B. In detail, the sensing block 620 may be connected to the sensing channels CH #1 to CH #n and may sense pixels P connected to corresponding sensing channels CH #1 to CH #n, thereby obtaining a sensing value. In detail, in the sensing mode or the hybrid mode, the sensing block 620 may obtain a sensing value from a driving transistor of a corresponding pixel P, based on the supply of a sensing source signal to each pixel P which is to be sensed.

The sensing block 620 may convert the obtained sensing value into a digital value to generate a sensing result RSD and may transfer the generated sensing result RSD to the timing controller 11. The sensing block 620 may include an analog-to-digital converter (not shown) for converting the obtained sensing value into a digital value.

It may be understood that those skilled in the art may modify the present invention in other detailed forms without changing the technical spirit or the essential feature.

For example, in the embodiment described above, a sensing block is illustrated as being included in a source drive IC, but this is merely an embodiment and the sensing block may be implemented as an element physically apart from the source drive IC.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

According to the present invention, in a case where only a partial region of a display panel is displaying an image, an operation of sensing an electrical characteristic of a driving transistor and an operation of compensating for image data may be performed without waiting for the turn-off of the display panel, and thus, a sensing time of a display apparatus may be reduced, thereby increasing sensing efficiency.

Moreover, according to the present invention, in a case where the display panel is driven as a turn-on region where an image is displayed and a turn-off region where an image is not displayed, characteristics of driving transistors included in the turn-off region may be sensed, and based thereon, a compensation value corresponding to a full region of the display panel may be predicted, whereby compensation data may be applied within an early time while the full region of the display panel displays an image again.

Moreover, according to the present invention, by inputting characteristic sensing results of driving transistors included in the turn-off region of the display panel to an artificial neural network model, a content type of an image displayed on a full region of a corresponding display panel may be determined, and a compensation value corresponding to a full region of a corresponding display panel may be predicted based on the compensation value matching the determined content type, thereby calculating an optimal compensation value based on the type of content.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A display driving apparatus comprising:
    a source driving circuit configured to supply a first source signal to first pixels included in a first display area of a display panel to display a first image and supply a second source signal to second pixels included in a second display area of the display panel to sense electrical characteristics of the second pixels when the display panel operates in a hybrid mode, the second display area being maintained in a turn-off state during the hybrid mode;
    a gate driving circuit configured to sequentially supply a gate pulse to first gate lines included in the first display area to drive the first gate lines and supply the gate pulse to at least some target gate lines among second gate lines included in the second display area to drive the target gate lines; and
    a timing controller configured to transfer first image data for the first image and sensing data for sensing to the source driving circuit and compensate for second image data for a second image which is to be displayed after displaying of the first image, based on a target compensation value obtained from a sensing result obtained through sensing by the source driving circuit,
    wherein the first display area comprises a plurality of continuous first gate lines, and the second display area comprises a plurality of continuous second gate lines, and
    wherein the target compensation value is determined based on a content type of a third image displayed before an operation of the hybrid mode, the content type of the third image being determined based on the sensing circuit.

2. The display driving apparatus of claim 1, wherein the timing controller comprises:
    a content type determiner configured to determine the content type of the third image displayed on the first display area and the second display area during a display mode performed before the operation of the hybrid mode, based on the sensing result; and
    a data compensator configured to determine the target compensation value based on a compensation value mapped to the content type and compensate for the second image data by using the target compensation value, and
    wherein the second image data is image data for the second image which is to be displayed on the first display area and the second display area during the display mode which is to be performed after the hybrid mode.

3. The display driving apparatus of claim 2, wherein luminance of the first image is lower than luminance of the third image.

4. The display driving apparatus of claim 2, wherein, when luminance of the first image is higher than luminance of the third image, the data compensator compensates for the second image data by using a compensation value determined based on a sensing result obtained through a sensing mode performed after an operation of the hybrid mode.

5. The display driving apparatus of claim 2, wherein the timing controller further comprises a first artificial neural network model trained using a training set including sensing values obtained in outputting image data corresponding to each content type for each content type,
    wherein the content type determiner inputs the sensing result to the first artificial neural network model to determine a result value, having a highest probability value among result values fed back from the first artificial neural network model, as a content type mapped to the sensing result.

6. The display driving apparatus of claim 2, wherein the content type comprises a normal type including images for a movie or drama, a graphics type including images for a user interface (UI) or a vehicular cluster, a sports type including a sports image, and a game type including a game image.

7. The display driving apparatus of claim 1, wherein the target gate lines are changed at every predetermined frame period.

8. The display driving apparatus of claim 1, wherein, in operating in a display mode, the display panel displays an image on the first display area and the second display area,
the source driving circuit supplies a source signal for displaying the image to the first and second pixels with, and
the gate driving circuit sequentially supplies a gate pulse to gate lines included in the first and second display areas to sequentially drive the gate lines.

9. The display driving apparatus of claim 1, wherein, in operating in a sensing mode, the first display area and the second display area of the display panel are maintained in a turn-off state,
the source driving circuit supplies a source signal for sensing electrical characteristics of the first and second pixels to the first and second pixels, and
the gate driving circuit sequentially supplies a gate pulse to gate lines included in the first display area and the second display area to sequentially drive the gate lines.

10. The display driving apparatus of claim 1, wherein the display panel is a digital cockpit equipped in a vehicle,
when a vehicle driving start signal and a display panel raising signal are received from an electronic control unit (ECU) of the vehicle, the timing controller sets an operation mode of the display driving apparatus to the hybrid mode,
when a display panel lowering signal or a display panel off signal is received from the ECU, the timing controller sets an operation mode of the display driving apparatus to a sensing mode, and
when a vehicle driving stop signal and the display panel raising signal are received from the ECU, the timing controller sets an operation mode of the display driving apparatus to a display mode.

11. A display driving method comprising:
setting an operation mode of a display driving apparatus;
when the operation mode of the display driving apparatus is a hybrid mode, sequentially supplying a gate pulse to first gate lines included in a first display area of a display panel and supplying a first source signal for displaying to first pixels connected to the first gate lines to display a first image on the first display area;
supplying a gate pulse to at least some target gate lines among second gate lines included in a second display area of the display panel and supplying a second source signal for sensing to second pixels connected to the target gate lines to sense electrical characteristics of the second pixels;
obtaining a target compensation value based on a sensing result; and
compensating for second image data of a second image which is to be displayed after displaying the first image, based on the target compensation value,
wherein the first display area comprises a plurality of continuous first gate lines, and the second display area comprises a plurality of continuous second gate lines, and
wherein the target compensation value is determined based on a content type of a third image displayed before an operation of the hybrid mode, the content type of the third image being determined based on the sensing result.

12. The display driving method of claim 11, wherein the compensating comprises:

determining the content type of the third image displayed on the first display area and the second display area before the operation of the hybrid mode, based on the sensing result;
determining the target compensation value based on a compensation value mapped to the content type; and
compensating for the second image data by using the target compensation value, and
wherein the second image data is image data of the second image which is to be displayed on the first display area and the second display area during a display mode performed after the hybrid mode.

13. The display driving method of claim 12, wherein in the compensating,
the second image data is compensated based on the sensing result when luminance of the first image is lower than luminance of the third image, and
the second image data is compensated by using a compensation value determined based on a sensing result obtained through a sensing mode performed after an operation of the hybrid mode when luminance of the first image is higher than luminance of the third image.

14. The display driving method of claim 12, wherein the sensing result is inputted to a first artificial neural network model and a result value having a highest probability value among result values fed back from the first artificial neural network model is determined as a content type mapped to the sensing result, and
wherein the first artificial neural network model is trained using a training set including sensing values obtained in outputting image data corresponding to each content type for each content type.

15. The display driving method of claim 12, wherein the content type comprises a normal type including images for a movie or drama, a graphics type including images for a user interface (UI) or a vehicular cluster, a sports type including a sports image, and a game type including a game image.

16. The display driving method of claim 12, wherein the target gate lines are changed at every predetermined frame period.

17. The display driving method of claim 12, further comprising, when the operation mode of the display driving apparatus is a display mode, sequentially supplying a gate pulse to the first gate lines and the second gate lines and supplying a source signal for displaying to the first pixels and second pixels to display a certain image on the first display area and the second display area.

18. The display driving method of claim 12, further comprising, when the operation mode of the display driving apparatus is a sensing mode, sequentially supplying a gate pulse to the first and second gate lines and supplying a source signal for sensing to the first and second pixels to perform sensing in the first display area and the second display area, and compensating for image data by using a compensation value obtained based on a result of the sensing.

19. The display driving method of claim 12, wherein, in the setting the operation mode, the display panel is a digital cockpit equipped in a vehicle,
when a vehicle driving start signal and a display panel raising signal are received from an electronic control unit (ECU) of the vehicle, the operation mode of the display driving apparatus is set to the hybrid mode, when a display panel lowering signal or a display panel off signal is received from the ECU, the operation mode of the display driving apparatus is set to a sensing mode, and when a vehicle driving stop signal and the display panel raising signal are received from the ECU, the operation mode of the display driving apparatus is set to a display mode.

\* \* \* \* \*